April 19, 1966    W. J. SACKETT    3,246,754
SCREEN CLASSIFIER WITH BRUSH CLEANERS
Filed March 25, 1963    8 Sheets-Sheet 3

INVENTOR
Walter J. Sackett
BY
ATTORNEY

April 19, 1966  W. J. SACKETT  3,246,754
SCREEN CLASSIFIER WITH BRUSH CLEANERS
Filed March 25, 1963  8 Sheets-Sheet 5

INVENTOR
Walter J. Sackett
BY
ATTORNEY

FIG. 8.

United States Patent Office 3,246,754
Patented Apr. 19, 1966

3,246,754
SCREEN CLASSIFIER WITH BRUSH CLEANERS
Walter J. Sackett, Baltimore, Md., assignor to The A. J. Sackett & Sons Company, Baltimore, Md., a corporation of Maryland
Filed Mar. 25, 1963, Ser. No. 267,652
7 Claims. (Cl. 209—316)

This invention relates to a classifier for granular material such as fertilizer although it is not restricted to use for fertilizer.

The market for fertilizer has become most competitive and it has therefore become imperative to furnish fertilizer granulated within specific ranges, as determined by the mesh of the screen through which it will pass. It is not only important to screen out oversized particles but it is also important to send the undersized particles or fines back for reprocessing to produce a product of the selected size. This range of size is most important because when the product is placed on the earth it is always passed through a sower or distributor set within the desired range. Coarse particles would stop the distributor, fines would overfertilize the soil.

Double decked screens have in the past been used in which the top deck or screen prevents the oversized particles from going through and they are removed from this screen for recrushing and the product desired is of a size to go through this top deck but not to go through a second deck or screen. The second deck or screen is of a mesh to allow the fines to go through for reprocessing and the product is removed from the lower deck or screen for use. These screens have usually been sloped vertically to remove separately both the oversize and the product while permitting the fines to go through the lower screen and they have likewise frequently been shaken or vibrated to separate the particles on the screens and to allow for rapid passage therethrough.

Figures 7, 12:
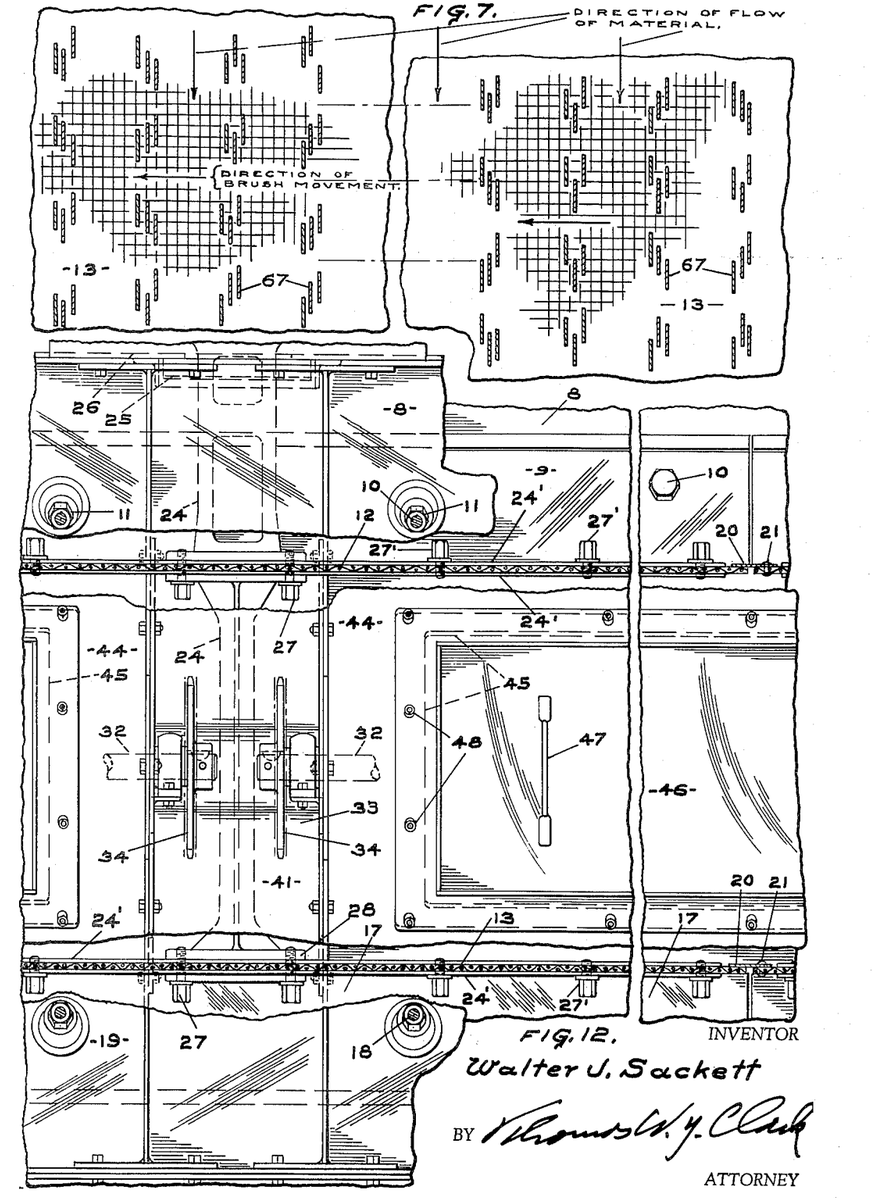
FIGURE 7 is a somewhat diagrammatic fragmentary sectional view on line 7—7 of FIGURE 4.
FIGURE 12 is a fragmentary side view partly in section showing the screens and the connection thereto of the vibrators.

The present invention is an improvement over this sloping agitated screen in that brushes are arranged to pass over the top of the lower screen, which is the more liable to stoppage or clogging because of the fineness of the mesh and because of the adherence of the fines to the screen and to each other and to the product so as to make difficult their separation from the product. The brushes pass transversely across the upper surface of the lower screen and lightly brush it. This not only removes material from the screen, but it stirs the material flowing down the screen by gravity. The tines of the brushes are preferably rectangular in cross section with the long dimension being in line with the direction of the gravity flow so that the side section of the brushes pass transversely across the sloping screen to clean the screen and they tend to push the material before them. The longitudinal placement of the tines in the brushes also prevents their interference with the flow of material on and through the screens, by gravity it would tend to flow between the groups of tines. The tines on alternate brushes are staggered in their spacing along the brush back as illustrated in FIGURE 7 so that substantially the whole surface of the screen is covered by them, but in sections so that the tines may be held firmly within their backing and so that close placing may not weaken the brush back and so as to permit a spaced stirring action, not only of the product but also for the cleaning of the screen. The agitation of the screen not only urges the material through the screen, but agitates the material after separating the oversized particles, to allow the fines to go through the screen; also the screen agitation co-acts with the brushes and their movement to additionally separate particles and pass the fines through the screen. When the agitation of the screen is vibration normal to the screen surface and when the brushes are adjusted to the proper contact with the screen, the vibrations actually cause the screen to strike against the brushes to very vigorously urge the fines throug the screens to make a clean separation between the desired product and the fines. The spacing permitting this striking also prevents the brushes from dampening the vibrations. This slight spacing is the preferred construction. The vibrations are frequent and of small amplitude so that there is substantially continuous brushing, since the brushes move slowly.

The brushes which go transversely across the lower screen are mounted on endless chains which carry them also across the underside of the upper screen of larger mesh and there is also some agitation of the material as it passes the brushes on the underside of the upper screen, and a cleaning of the underside of the upper screen. The vibration of the upper screen against the brush tips urges the product through the screen as well as maintaining its underside clean. Without the brushes the material would tend to accumulate especially on the lower screen and its cleaning would be very difficult because of the necessity of enclosing the screens to keep the material in control and also to minimize the free dust in the plant. Also the build up of the screen clogging material on the lower screen would produce an inferior product because the fines tend to be a substantial portion of this build up and should be passed through the screen away from the product. Means are provided in the construction of this invention to maintain the brushes not only parallel to their respective screens but to maintain them from tipping and to maintain them from sagging in the direction of the vertical slope of the screens.

Pans or trays are placed on the leading side of the brushes to receive material carried around the rising side of the chains, to prevent material accumulation at that side.

Although the invention is shown in relation to a vibrating screen, it will be apparent that other means of agitating the screens, especially the lower one, could be provided. In this invention although screen cleaning is much less frequently required than in other screens, it is a further object to provide doors for repairs and inspection and particularly for the screen contact adjustment of the brushes in their parallel relationship courses over and under the screens.

For a better understanding of the present invention together with other objects and advantages thereof reference is made to the following description in connection with the accompanying drawings, forming a part hereof, and in which.

In the drawings similar numerals refer to similar parts throughout the several views.

The classifier has the housing 1 with a feeding chute 2, a discharge chute 3 for the rejects or oversize material, a discharge chute 4 for the product desired and a discharge chute 5 for the fines. The housing is mounted on pivoted bearings 6 on beams 7. Longitudinally extending angles 8 form part of the sides of the housing and have bolted on their interior U-shaped screen supporting and tensioning members 9, held by bolts 10 and nuts 11 and the lower angle of these members have bent thereover an upper coarse screen 12 of substantially six mesh. The bending of the sides of the screen over the angles of members 9 adequately holds them in place. A similar screen 13 but of 16 mesh is bent around similar U-shaped screen supporting and tensioning members 17 held by bolts 18 on similar side members 19.

Figures 1, 15, 21:
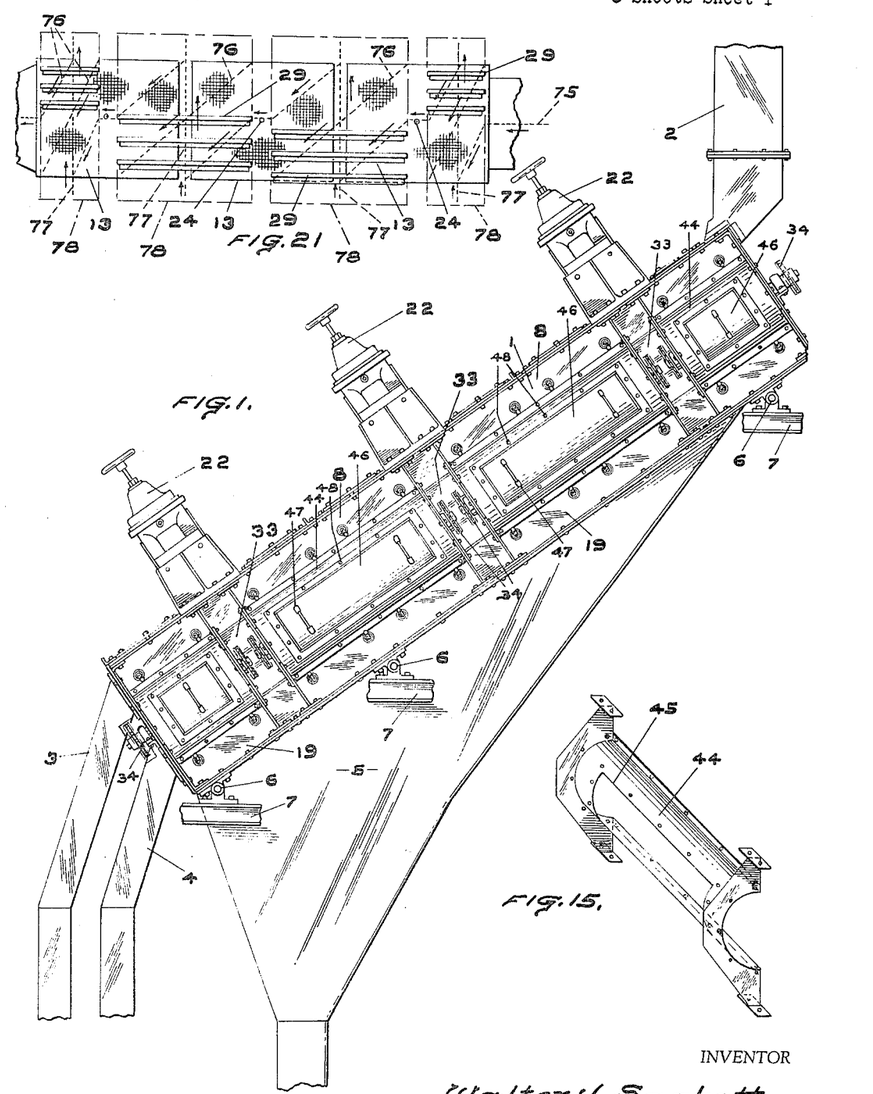
FIGURE 1 is a side elevational view of the classifier of this invention.
FIGURE 15 is a perspective view of one of the removable side enclosures for the classifier housing.
FIGURE 21 is a diagrammatic view of the lower screen showing the path of the granular material thereacross.
Figure 2:
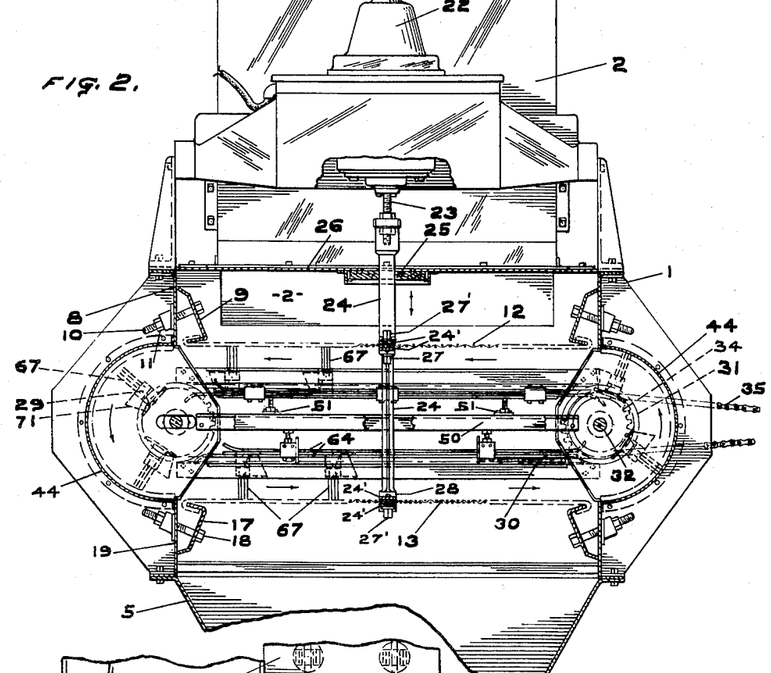
FIGURE 2 is a transverse fragmentary sectional view thereof.
Figure 3:
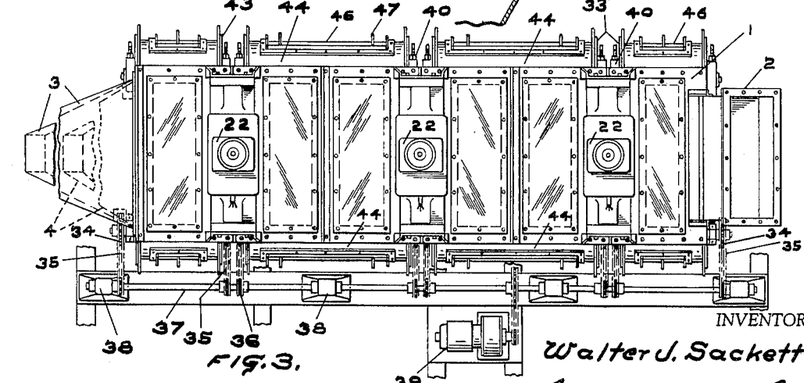
FIGURE 3 is a top plan view thereof, with the casing horizontal.

The housing 1 is sloped at a substantial vertical angle as shown in FIGURE 1, the slope being substantially thirty-six degrees to the horizontal and both the upper and the lower screens are made up of separate sections of screening material which are mounted substantially independently of each other longitudinally of the housing and are bridged between their separate sections by strips 20 connected to the upper section as shown at 21 and the strip overlaps the next lower section screen so that the material passes down the three sectioned screens, both upper and lower, as though the screens were each one continuous long screen. Centrally of each screen section and mounted on the top of housing 1 as shown in FIGURES 1 and 2 are electric vibrators 22 with their operating armatures 23 connected to screen brackets 24 passing through gaskets 25 in the top 26 of the casing 1. These screen brackets 24 are divided at the top screen 12 and are connected therethrough by screws 27 and the central part of the screen bracket 24 is similarly connected as at 28 to the lower screen. Shorter screws 27' connect strips 24' on both sides of each screen to the brackets 24. These electric vibrators are of the type used on the "Hum-mer" electric screens manufactured by The W. S. Tyler Co. of Cleveland 14, Ohio. They include an electromagnet with an armature 23 connected to the screen operating bracket 24. Their rate of vibration and the stroke of the vibration may be varied as desired and in relation to the material being classified and they form no part of this invention, except as they are used in combination with the whole.

Between each screen vibrator bracket passing transversely of the screens and housing is a series of long brushes 29 mounted on endless chains 30 carried by sprockets 31 on shafts 32. There are separate shafts for each pair of chains and their mounted brushes. Each individual shaft 32 on one side of the housing passes through the sides of insets 33 in the housing 1 and has on its respective ends sprockets 34 driven by chains 35, running over sprockets 36 on shaft 37 mounted in bearings 38 and driven by motor 39. The shafts 32 on the side opposite the drive have chain slack take-up mechanisms 40. The interior of the classifier is subjected to very high temperatures and excessively dusty operation, making this brush mounting and driving construction most desirable. The insets in the casing also permit the drive to be separate from the casing interior and the placement of the chain sprockets off the screens permits the complete use of the whole screen surface.

The insets 33 have inner arcuately directed portions 41 and side walls 42 permanently welded thereto and these portions 41 are likewise welded to the longitudinal side wall portions 8 and 19. The side walls 42 have circularly arcuate portions 43 welded thereto and to these are bolted the end flanges of side sectional housing portion 44. These latter portions have longitudinally extending openings for doors therein 45, to permit ready access to each screen portion and its adjacent brushes for adjusting the brushes or repairing and these openings are closed by doors 46 having thereon handles 47, the doors being held in place by bolts 48. The member 44 and its end flanges, shown in FIGURE 15, may be removed for major repairs.

Angles 50 are connected to each arcuate portion 42 substantially in line with the shaft sections 32 and extend transversely of the housing on both sides of and between the insets 33 on each side of the housing. These angles 50 have mounted therebetween under the upper screen and extending longitudinally, angles 51. These angles 51 extend inside the housing adjacent the shafts 32 and have adjustable bolts 52 passing through their upper surfaces for supporting rails 53 which have chain guide elevations 54 on which the top run of the chains 30 operate, for purpose of guiding, supporting and maintaining the top flight of brushes in vibratory contact with the underside of the upper screen for purpose of properly cleaning this side of the upper screen in their transverse passage. These rails 53 have mounted on their outside brackets 55 which have an outer C shaped portion 56 mounting guides or runners 57 extending transversely of the machine and in which followers 58 mounted on the back of each brush at their ends, ride. These followers and their runners 57 maintain the brushes in an upright position and keep them from cocking and the rails 53 maintain the brushes in accurate parallelism with the upper screen. The ends of the rails flare outwardly as at 59 for the reception and release of the followers. A furthere C shaped member 60 is mounted on bolt 61 on angle 51 for accurate vertical adjustment thereof by nuts 62 and this C shaped angle 60 has a smaller bracket 63 thereon, the two carrying guides or runners 64 to support the followers 58 on the lower transverse run of the brushes to hold them in accurate parallelism with the lower screen section and to prevent the brushes from cocking.

Figures 4, 5, 6:
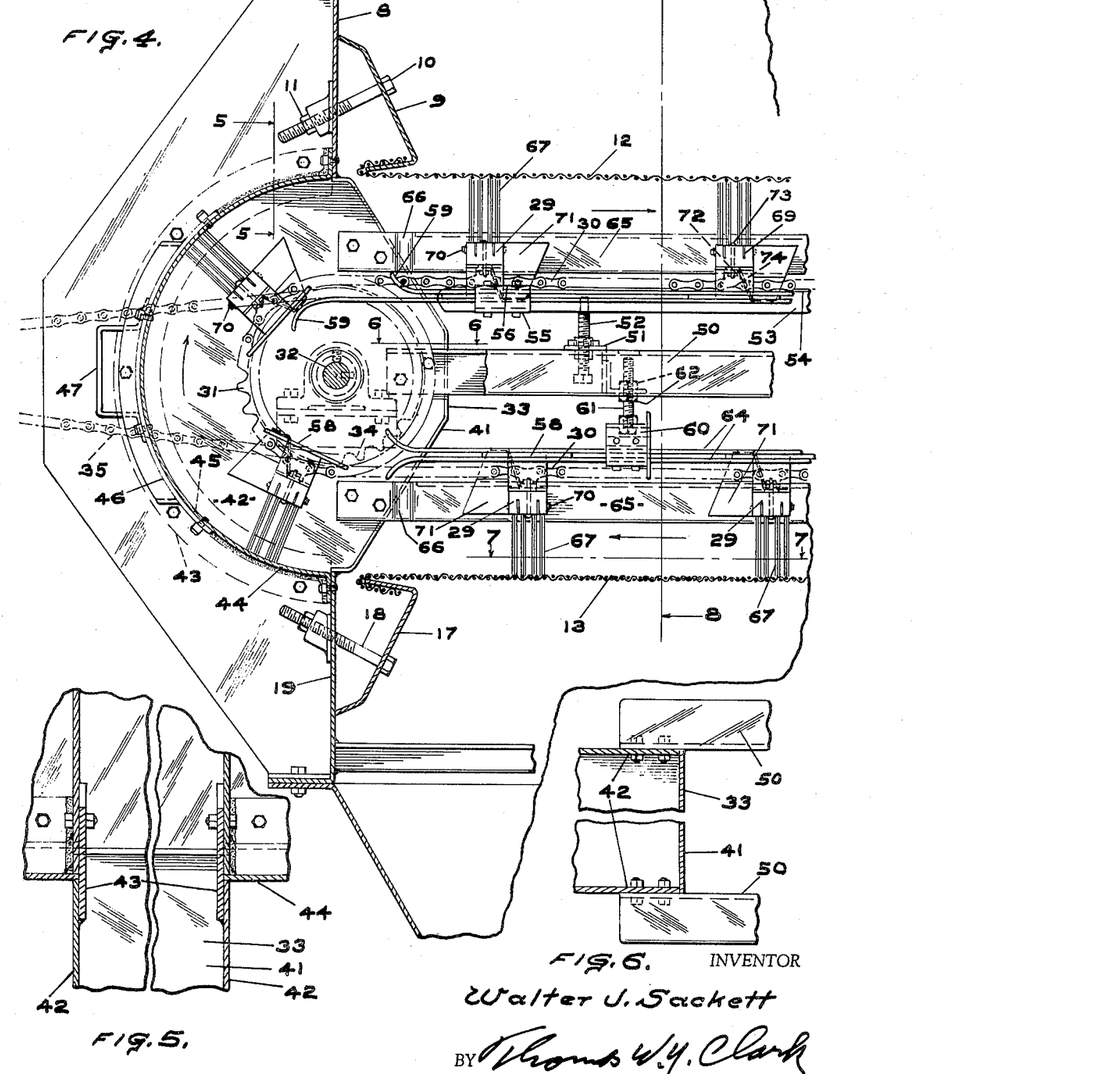
FIGURE 4 is a transverse sectional view on the drive side looking toward the discharge end, on an enlarged scale.
FIGURE 5 is a fragmentary sectional view on line 5—5 of FIGURE 4.
FIGURE 6 is a fragmentary sectional view on line 6—6 of FIGURE 4.
Figure 8:
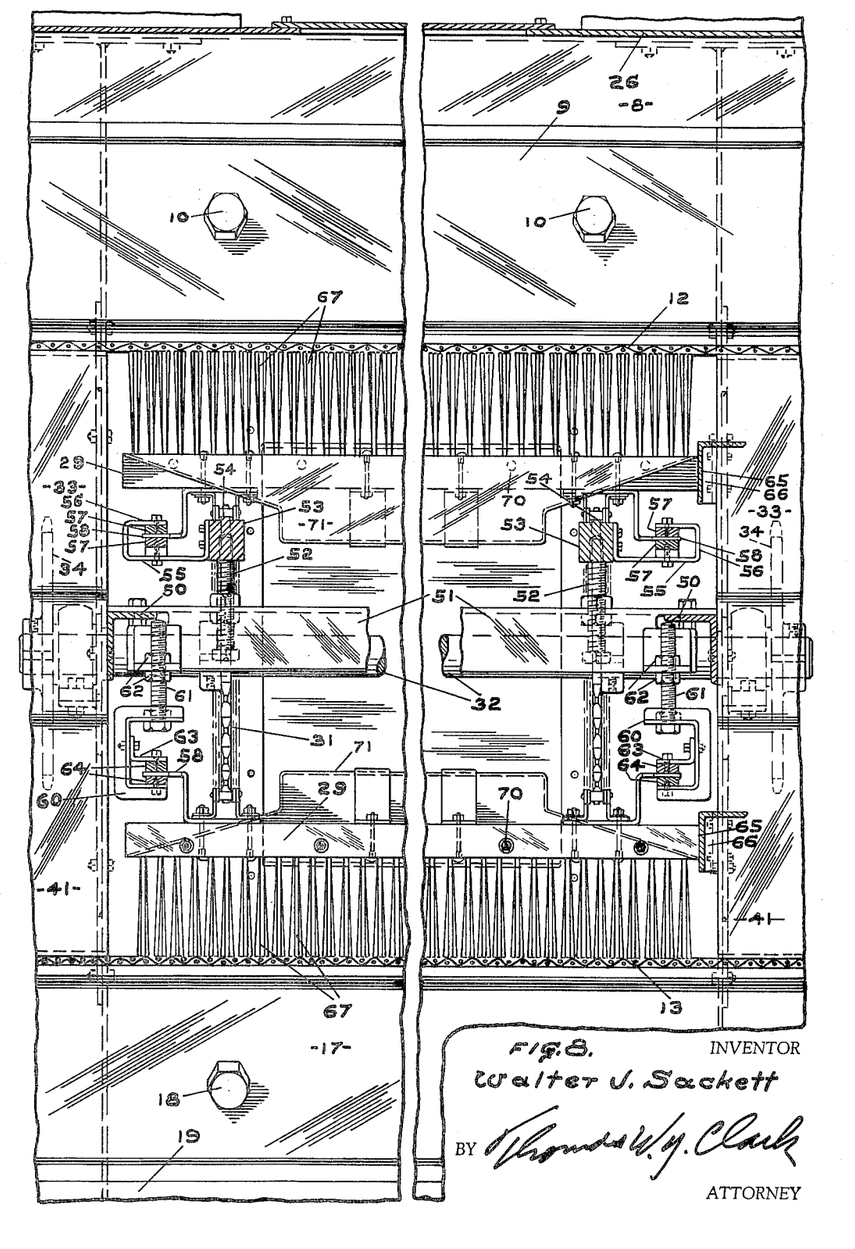
FIGURE 8 is a fragmentary sectional view on line 8—8 of FIGURE 4.
Figures 9, 10:
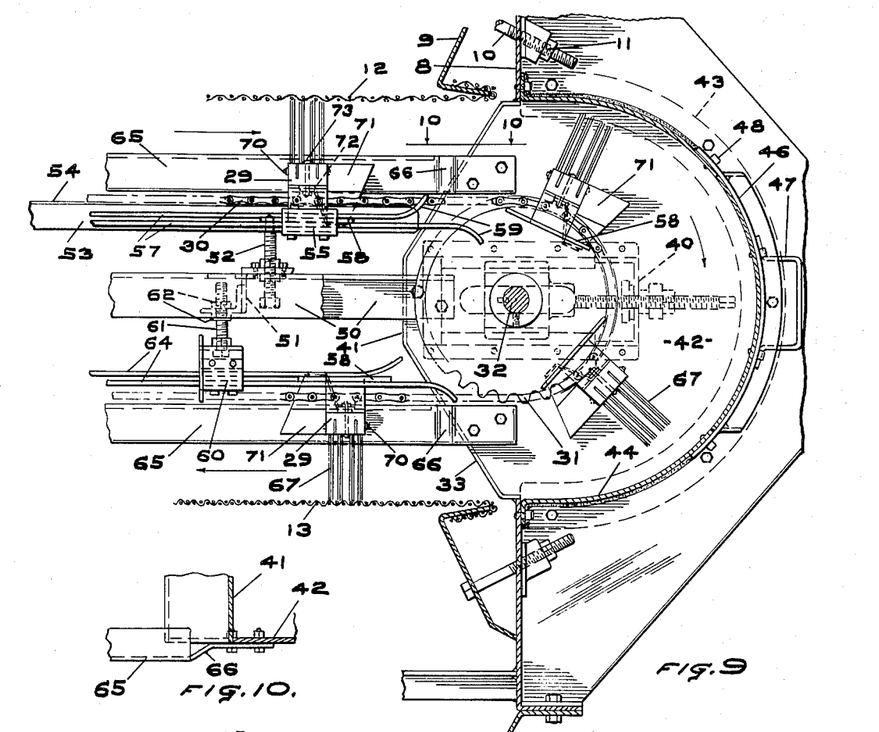
FIGURE 9 is a fragmentary sectional view and a continuation of FIGURE 4 of the driven side of the classifier looking toward the discharge end.
FIGURE 10 is a fragmentary sectional view on line 10—10 of FIGURE 9.
Figures 13, 14:
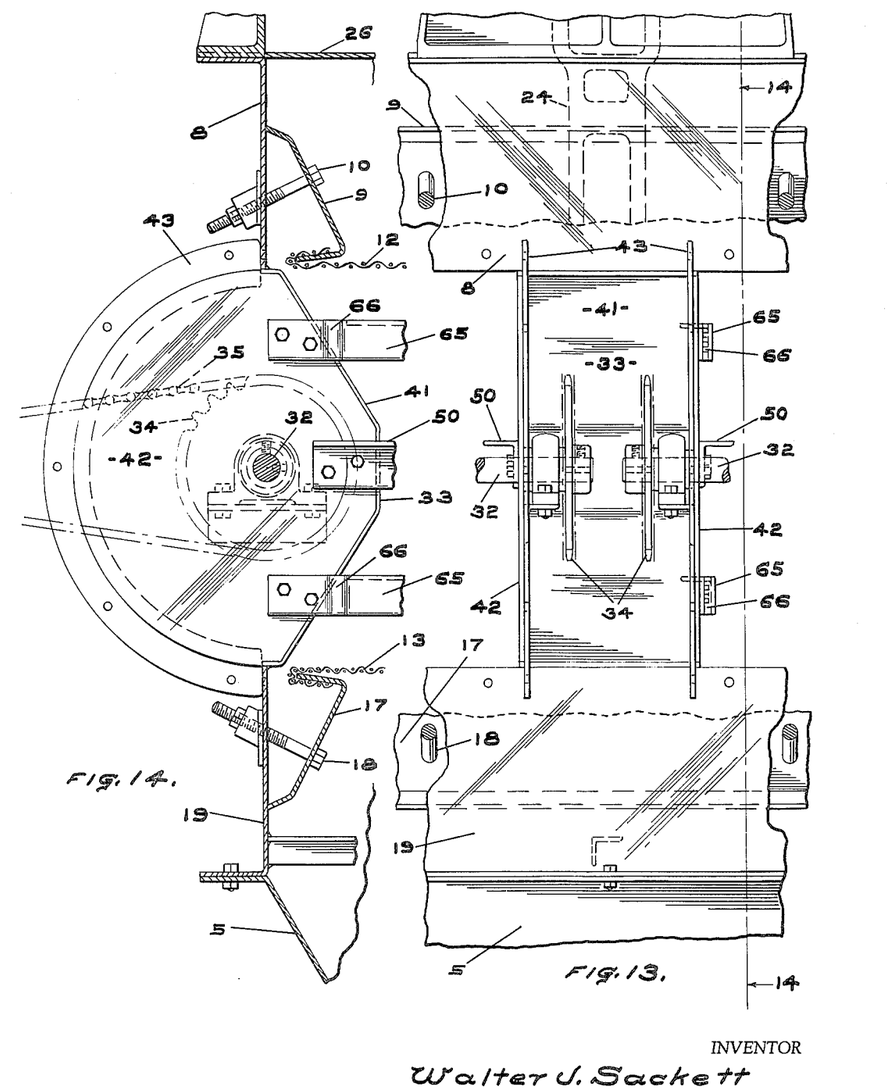
FIGURE 13 is a fragmentary side view showing the connection between the upper and lower frame structures and a portion of the driving mechanism for the brushes.
FIGURE 14 is a sectional view on line 14—14 of FIGURE 13.

Since the classifier housing slopes downwardly, there would be some tendency for the mounted brushes and their respective sprocket chains to bow downwardly between their mounting sprockets and this action is prevented by the angles 65 mounted on the lower of the side walls 42 as shown in FIGURES 4 and 14. These angles 65 are offset upwardly toward the brushes as shown at 66 in FIGURE 10, to contact the lower ends of the brushes as shown in FIGURE 8.

Figures 11, 16, 18, 19, 20:
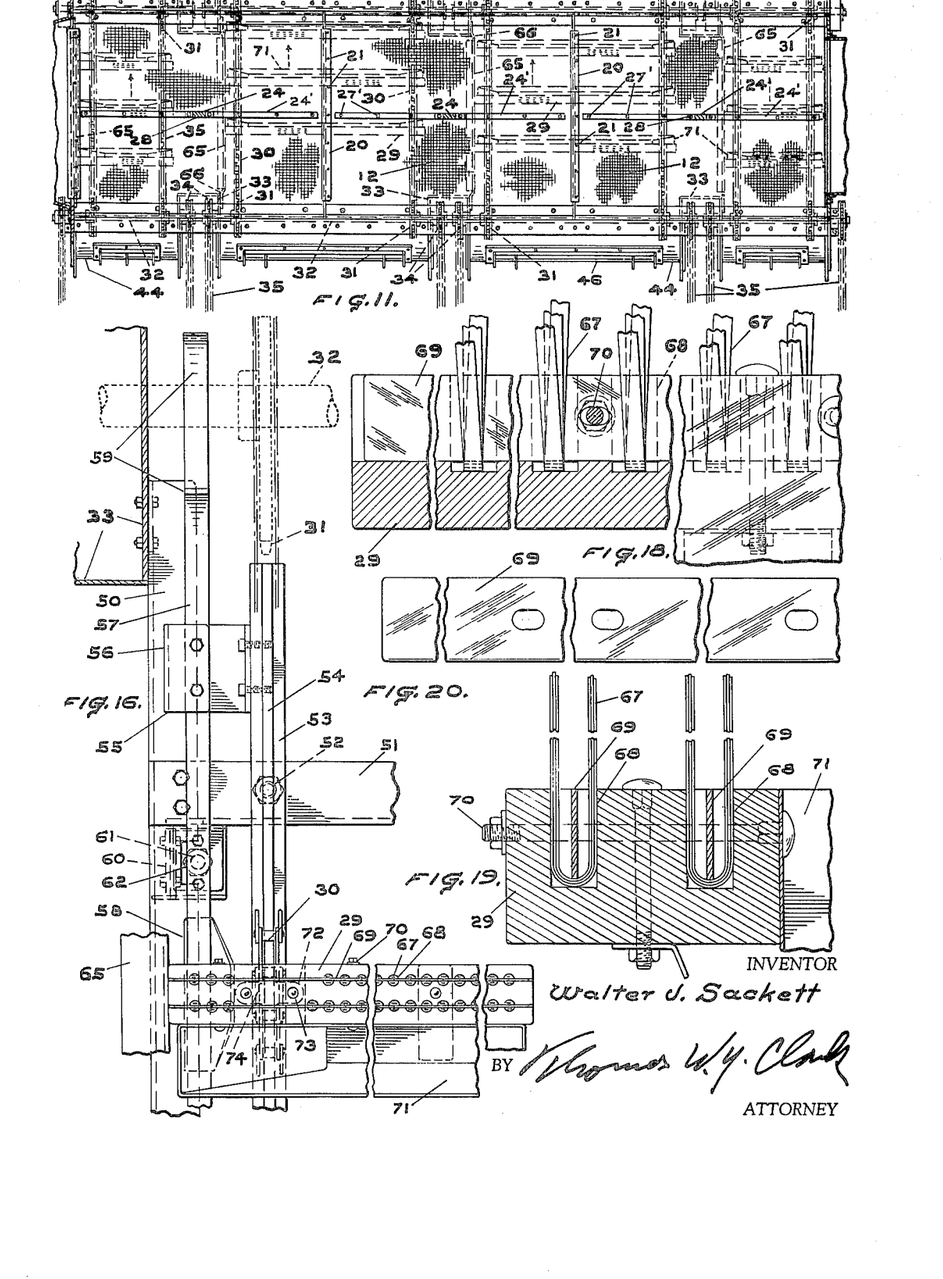
FIGURE 11 is a fragmentary plan view, partly in section, with the tops of the classifier sections removed.
FIGURE 16 is a fragmentary plan view partly in section of the supporting and guiding structure for the brushes.
FIGURE 18 is a fragmentary view partly in section taken longitudinally of one brush.
FIGURE 19 is a transverse sectional view of one brush showing the mounting of the tines therein.
FIGURE 20 is a fragmentary elevational view of one of the strips to hold the tines in place.

The brushes 29 have metal tines 67 as shown in FIGURES 18 and 19, three tine parts forming tufts, are bent parallel in U shape to make six tines in each hole 68 in the base of the brush. These tines are held in place by strips 69 which have, passing between the holes 68 for the tines, bolts 70 to hold them in place.

Figure 17:
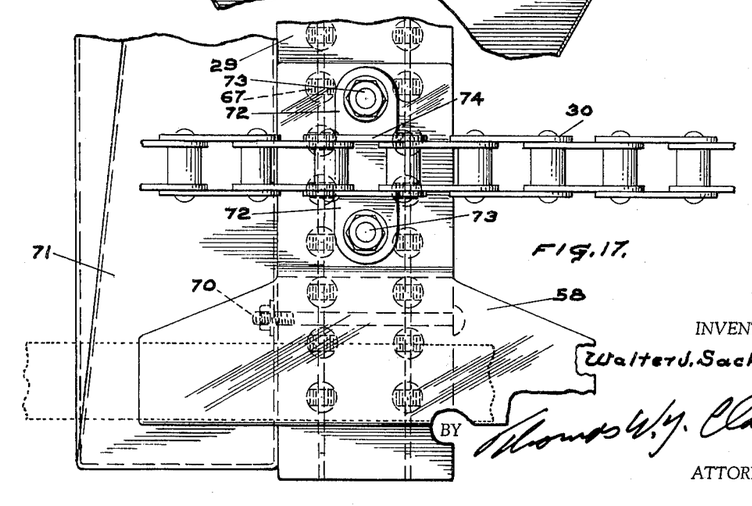
FIGURE 17 is an enlarged fragmentary plan view of the end assembly of one of the brushes on its supporting chain.

Upon the initial operation of the machine, the brushes in passing across the lower screen carrying some material before them, principally due to their cleaning action of the screen surface, the space or trough formed by the U shaped member 17 and their adjacent side walls 19 are filled and remain filled with the initially brushed material. The tendency of the brushes is to continue to brush material in front of them to the near or drive side of the machine adjacent the area of their elevation to the top screen. To prevent the accumulation of material at this area and possible jamming of the mechanisms, trays or pans 71 are mounted on the leading side of the brushes and are held in place by the bolts 70. As the brushes move upwardly on their chains around the sprockets 31, the material is picked up and carried upwardly by the brushes at the circularly arcuate side wall of the housing 44 of the casing upon the tines of the brushes reaching a sufficiently sharp angle the material falls downwardly into the trays or pans 71 and is carried across the top run of the brushes and as they descend on the other side, the material is dropped from the pans 71 and carried back over the lower screen to reclaim the product, the fines passing through the screen and the product passing on down by gravity to its proper chute. The pans or trays 71 furnish reinforcement to the long wooden brushes, to prevent their bending. The brushes have brackets 72 held on the back thereof by bolts 73 and the brackets at their angled ends 74 form links of the chain 30 as shown in FIGURE 17.

FIGURE 21 is a diagrammatic view of the lower screen. Fine dotted lines 75 indicates the path of the material from the feed end inlet. The brushes 29 move across the screen from the top to the bottom of the figure. Material falls from the top screen to the lower screen where it tends to move to the left as shown in this figure under the influence of gravity. But because of the movement of the brushes its overall tendency is to move diagonally as shown by the lines 76. This diagonal movement as indicated for each lower screen section gives a longer path for the material than would be available if the material passed straight through the casing on the lower screen under gravity. It is a longer passage as the diagonal is greater than the straight length of each screen. The amount of additional screen surface available is nearly equal to the length of an additional screen section because the material moves across the screens on the diagonal under the influence of gravity and the brushes, rather than simply straight through under the influence of gravity.

The number of brushes on each pair of chains and their speed or timing across the screens and their operation, whether constant or for predetermined periodic times, may be varied in accordance with the type of material being screened.

The center dotted line 77 represents the path of the material being carried back by the trays for rescreening. The rectangular dot and dash lines 78 represent the areas covered by the brushes.

While there has been described what is at present considered to be the preferred embodiment of this invention, it will be obvious to those skilled in the art that various changes and modifications may be made therein without departing from the invention, and it is, therefor, aimed to cover all such changes and modifications as fall within the true spirit and scope of the invention.

What is claimed as new and is desired to be secured by Letters Patent is:

1. A vertically sloping substantially flat vibrating screen and housing therefor for classifying particles according to size in which the screen retained material tends to travel in the direction of slope of the screen surface in effecting the separation, an upper material inlet chute on said housing, a coarse material screen operatively mounted in said housing below said inlet chute, a fine material screen mounted in said housing below and substantially parallel to the coarse material screen, each of said screens comprising one or more sections, the screens in the respective sections being aligned with each other, separate lower material discharge chutes on said housing for material retained on each screen and for that passing through the fine material screen, means supported on the housing and connected to and positioned substantially centrally of the surface of each screen section to vibrate said screens sufficiently to impart progressive movement thereover to material to be classified, screen cleaning brushes mounted on endless chains with chain sprockets having shafts in line with the screen slope and parallel to and between said screens mounted on the housing, said brushes travelling in endless procession across the screens and engaging the respective adjacent screens, means connected to said shafts to unidirectionally drive said chains and means on the housing to guide the brushes in paths parallel to the respective screens.

2. The screen of claim 1 including material collecting trays on the forward movement side of each brush to receive therein material lifted by the brushes from the fine material screen adjacent the path of the brushes passing upwardly from the fine material screen to the coarse material screen to carry the same under the coarse material screen and to discharge the same in front of the brushes on the fine material screen on the return of the brushes thereto.

3. A vertically sloping vibrating substantially flat screen and housing therefor for classifying particles according to size in which the screen retained material tends to travel in the direction of slope of the screen surface in effecting the separation, an upper material inlet chute on said housing, a plurality of aligned screen sections comprising a coarse material screen mounted on and operatively positioned in said housing below said inlet chute, a plurality of aligned screen sections comprising a fine material screen mounted on and in said housing below and substantially parallel to the coarse material screen, separate lower material discharge chutes on said housing for material retained on each screen and for that passing through the fine material screen, means mounted on the housing and connected to each screen section adjacent the center of the surface thereof to vibrate the screen section sufficiently to impart progressive movement thereover to material to be classified, screen cleaning brushes mounted on endless chains with chain sprockets having shafts mounted on the housing in line with the screen slope and parallel to and between said screens, said brushes travelling in endless procession across the screens and engaging the same and passing between adjacent vibrating means, means connected with said shafts to unidirectionally drive said chains and means on the housing to guide the brushes in paths parallel to the respective screens.

4. A substantially flat screen mounted in sloping position for classifying particles according to size in which the screen retained material travels in the general direction of slope of the screen surface in effecting separation, comprising brushes mounted to move above and in a direction transverse to the direction of slope of the screen in endless procession to engage and clean the same and promote the passage of material therethrough, said brushes having screen engaging tines disposed perpendicularly to the plane of the screen as they pass thereover, endless chains mounted adjacent the screen and carrying said brushes, means to drive the chains and guide means having upper and lower surfaces mounted adjacent the screen and transverse to the direction of slope of the screen, and said brushes having elements positioned between said surfaces to support the brushes and maintain the tines thereof in a plane perpendicular to the plane of the screen in their passage over the screen surface.

5. A multiple classifier comprising at least two superposed substantially flat parallel screens mounted in sloping position and down the upper surfaces of which the retained material travels in effecting separation, means to vibrate said screens, means mounted adjacent said screens and travelling in endless procession transverse to the direction of screen slope over a lower screen and under an upper screen, said means to vibrate said screens producing vibratory impact of said screens with said travelling means to loosen material from the surfaces thereof, said travelling means including brushes having spaced tufts of tines in which the tines of said tufts are substantially wider than they are thick, the tines being positioned in the brushes to place their wide dimensions normal to their direction of advance to pass the material in said spaces between the tufts, certain of said tufts in said brushes of said travelling means being in staggered relationship with respect to certain other tufts therein and means to drive said travelling means.

6. A substantially flat screen mounted in sloping position for classifying particles according to size in which the retained material tends to travel on the top surface of the screen in the direction of screen slope in effecting the separation, driven brush means mounted adjacent the screen to move above the screen and transverse to the direction of screen slope to engage and brush the screen top surface to promote the passage of material therethrough, means to drive said brush means, means to vibrate the screen from and against the brush means to produce a vibratory impact of the screen against the brush means, said brush means being mounted to move a portion of the material to one side of said screen surface, means to pick up a portion of said material moved to one side conveying the same above the top plane of the screen to the opposite side of the screen and reintroducing the said conveyed material to the surface of the screen for rescreening.

7. A material classifier comprising a substantially flat screen mounted in sloping position for classifying particles according to size in which the particles travel in the direction of slope of the screen surface in effecting separation, comprising brush means in operative relationship with said screen and mounted to move in a direction transverse to the direction of slope of said screen for cleaning the same and promoting passage of particles therethrough, means for driving said brush means, guide means mounted adjacent said screen to guide the brush means in their movement transverse with respect to the direction of slope of the flat screen and maintain proper operative relationship of said brush means with said screen, a second screen of larger mesh mounted above the first screen and parallel thereto, said brush means comprising a series of brushes mounted on endless chains and travelling over the upper surface of the first screen and the lower surface of the second screen and means carried by the brushes to convey excess material brushed aside on the first screen under the second screen and back to the first screen for repeating the classifying operation.

References Cited by the Examiner

UNITED STATES PATENTS

| | | | |
|---|---|---|---|
| 225,218 | 3/1880 | Guilder | 209—390 |
| 440,301 | 11/1890 | Boorman | 209—390 |
| 450,310 | 4/1891 | Eche | 209—347 |
| 1,455,785 | 5/1923 | Hackstaff | 209—310 |
| 1,536,363 | 5/1925 | Ware | 209—390 |
| 1,549,875 | 8/1925 | Horne | 209—347 |
| 2,683,533 | 7/1954 | Paul | 209—315 |
| 2,908,391 | 10/1959 | Frevert | 209—315 |
| 3,087,617 | 4/1963 | Forsberg | 209—326 |

FOREIGN PATENTS

| | | |
|---|---|---|
| 474,458 | 4/1929 | Germany. |
| 139,865 | 3/1920 | Great Britain. |

FRANK W. LUTTER, *Primary Examiner.*

HARRY B. THORNTON, HERBERT L. MARTIN,
*Examiners.*

R. HALPER, *Assistant Examiner.*